March 12, 1957  W. M. ALLISON  2,785,351
ELECTRICAL CAPACITORS
Filed June 10, 1952

INVENTOR.
WILLIAM M. ALLISON
BY
Arthur G. Connolly
ATTORNEYS

United States Patent Office 2,785,351
Patented Mar. 12, 1957

2,785,351

ELECTRICAL CAPACITORS

William M. Allison, Williamstown, Mass., assignor to Sprague Electric Company, North Adams, Mass., a corporation of Massachusetts Application June 10, 1952, Serial No. 292,685

1 Claim. (Cl. 317—260)

The present invention relates to new and improved electrical capacitors.

More particularly, this invention relates to a new type of wound electrostatic capacitor which overcomes the problems resulting from the so-called "margin" effect. With most wound capacitance units, the usual marginal difficulty is that the electrostatic gradient is concentrated at the edge of the electrodes. This leads to breakdown at the portion of the dielectric separating the foil edges.

It is an object of this invention to produce an electrostatic capacitor which is not subjected to this difficulty. A further object of the invention is to produce a new and improved electrostatic capacitor which will not break down because of any electrostatic concentration within the capacitance foils. These and other objects of the invention will be seen in this specification and the appended claims.

The above objects are obtained by spirally winding the various parts of an electrostatic capacitor around a core in much the same manner as a continuous paper strip is wound forming a common soda straw. The various necessary strips are applied on top of one another until all of the elements of an electrostatic capacitor are present. The final windings are removed from the central core and either wound into a cylinder or stacked or bent to a desired configuration.

Figure 1:
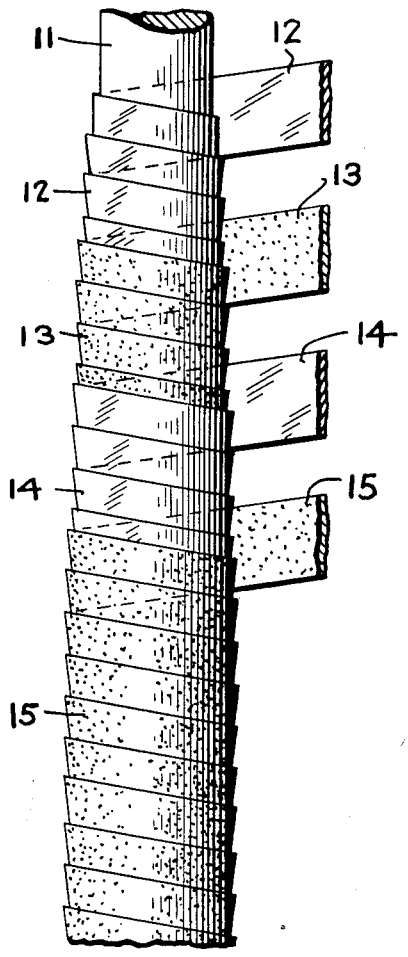
Figure 2:
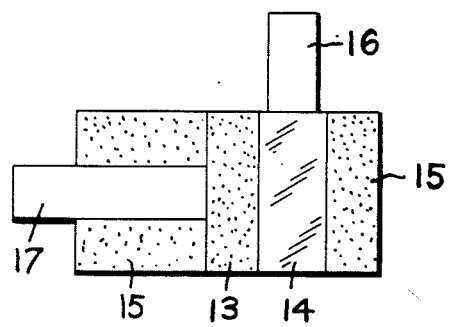

These new constructions of the invention are more specifically seen from the accompanying drawing in which Figure 1 diagrammatically shows the spiral winding of capacitance units and in which Figure 2 pictures a flat wound unit formed from a spiralled unit in accordance with the invention. For convenience, the same numerals designate like parts in both figures.

In forming the new capacitors of this invention, first a metallic foil 12 is wound about a central core 11 in an endless fashion. Next, a dielectric sheet 13 is applied on top of this foil in the same manner of winding. A second electrode 14 is then applied upon the dielectric 13 in the spiral manner, and this, in turn, is covered by a fourth winding of a second dielectric 15. In all of these cases the direction of winding is substantially immaterial and the various layers can be applied by winding in opposite directions.

Once the various foils and dielectrics have been positioned, the core 11 is removed and the entire spiral is pressed so as to assume a flat configuration. It is then rolled into a capacitance unit and provisions for electrical connections are made in conventional manner at the end of the wound cylinders.

One manner of inserting terminal tabs is shown in Figure 2. Here a tab 17 has been inserted within the space formerly occupied by the core 11 prior to the flattening of the unit and a second electrode tab 16 is wound next to an exposed portion of the electrode foil 14. Other means such as exposing both of the electrode layers employed and soldering leads directly to them can be utilized.

It is possible to modify the procedure indicated in the above discussion in several manners; instead of separate dielectric and electrode layers, metallized dielectrics in which the metallic coating is confined to only one surface, the coated layers being wound with the coatings out of contact with one another. Also, several separate layers of dielectric or layers of different dielectrics can be employed between the electrodes.

A further modification of this invention is to delete the second dielectric 15 of Figure 1 leaving a capacitor unit comprising metallic foils 12 and 14 separated by the dielectric 13. After the foils 12 and 14 and dielectric 13 are positioned upon the central core 11 the core 11 is removed and the entire spiral is pressed so as to assume a flat configuration. The unit is rolled into a capacitor wherein one electrode forms the outer segment of the said capacitor. The edges of the outer foil of said capacitor are joined, as by soldering or metallic spraying, to provide mechanical strength to the rolled unit in addition to decreasing the residual inductance of the capacitor. A terminal tab for this outer electrode 14 is connected to the soldered edges or it may be mechanically and electrically connected to the plane of the outer foil. The second electrode tab, connected to the inner metallic foil 12, is brought out from the outer end of the spiraled unit and protected from the outer metallic foil 14 by an extension of the dielectric 13 beyond the outer end of said foil 14. Other methods of connecting the tabs are equally suitable e. g. the tab 16 might be brought out through the center axis of the spiral by providing suitable insulation from the outer metallic foil 14.

The broad teachings of this invention extend to continuous dielectric tubings. Such tubings can be metallized on one or both surfaces and wound into a single capacitance unit. It will be realized that these dielectric tubings do not have to be wound into a spiral before being flattened, but can be merely flattened and then wound into a final unit.

Once the capacitance sections of this invention have been formed, they can be impregnated with any of the impregnants normally used in the art, such as, for example chlorinated naphthalene or the like. Protective coatings of wax, resin, or the like, can be applied to them, and these units can be encased in any of the many of the manners known to the art.

As many apparently widely different embodiments of my invention may be made without departing from the spirit and scope hereof, it is to be understood that my invention is not limited to the specific embodiments hereof except as defined in the appended claim.

What I claim is:

A capacitor comprising a first flat tubular metallic electrode of helically wound strip enveloped by a flat sleeve of helically wound dielectric ribbon, all the adjacent turns of said wound ribbon being in partially overlapped relationship, and a flat tubular metallic electrode sleeve of helically wound strip enveloping the dielectric sleeve and separated from the first electrode, said flat assembly being rolled up in the direction of its longitudinal axis.

References Cited in the file of this patent
UNITED STATES PATENTS

| | | |
|---|---|---|
| 346,510 | Spalding | Aug. 3, 1886 |
| 592,441 | Patterson | Oct. 26, 1897 |
| 1,745,096 | Jayne | Jan. 28, 1930 |
| 2,232,320 | Georgiev | Feb. 18, 1941 |
| 2,387,759 | Jarvis | Oct. 30, 1945 |
| 2,399,798 | Grouse | May 7, 1946 |
| 2,470,826 | McMahon | May 24, 1949 |
| 2,691,698 | Schmidt | Oct. 12, 1954 |

FOREIGN PATENTS

| | | |
|---|---|---|
| 562,821 | Great Britain | July 18, 1944 |